United States Patent
Liu

(10) Patent No.: US 10,104,700 B2
(45) Date of Patent: Oct. 16, 2018

(54) MESSAGE PROCESSING METHOD, MME SELECTION METHOD, AND APPARATUSES

(71) Applicant: Huawei Technologies Co., Ltd., Shenzhen, Guangdong (CN)

(72) Inventor: Hai Liu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 113 days.

(21) Appl. No.: 15/099,959

(22) Filed: Apr. 15, 2016

(65) Prior Publication Data

US 2016/0234872 A1 Aug. 11, 2016

Related U.S. Application Data

(63) Continuation of application No. PCT/CN2014/082260, filed on Jul. 15, 2014.

(30) Foreign Application Priority Data

Oct. 15, 2013 (CN) .......................... 2013 1 0482935

(51) Int. Cl.
*H04W 4/00* (2018.01)
*H04W 76/02* (2009.01)
(Continued)

(52) U.S. Cl.
CPC ......... *H04W 76/021* (2013.01); *H04W 48/18* (2013.01); *H04W 76/11* (2018.02)

(58) Field of Classification Search
CPC ............................. H04W 76/021; H04W 76/11
See application file for complete search history.

(56) References Cited

U.S. PATENT DOCUMENTS 8,542,590 B2 9/2013 Lopez et al.
9,271,165 B2 * 2/2016 Xu .................... H04W 24/02
(Continued)

FOREIGN PATENT DOCUMENTS

CN 101483850 A 7/2009
CN 101547521 A 9/2009
(Continued)

OTHER PUBLICATIONS

Hiroki Baba et al., "A Study of Core Network Selection Mechanism on multi-EPC environments," IEICE Technical Report, NS2013-90, The Institute of Electronics, Information and Communication Engineers, Oct. 10, 2013, 7 pages.
(Continued)

*Primary Examiner* — Alvin Zhu

(57) ABSTRACT

The present application discloses a message processing method, an MME selection method and apparatuses. The method includes: receiving, by a mobility management entity (MME), a first message sent by an evolved NodeB (eNB), where: multiple virtual machines are deployed in the MME; the first message includes a non-access stratum (NAS) message sent by user equipment UE and identification information of a target virtual machine; and the identification information of the target virtual machine is generated by the target virtual machine in the MME; determining, by the MME according to the identification information of the target virtual machine, the target virtual machine from the multiple virtual machines, and allocating the NAS message to the target virtual machine for processing; and returning, a first response message generated by the target virtual machine to the eNB, so that the first response message is sent to the UE by using the eNB.

23 Claims, 6 Drawing Sheets

(51) Int. Cl.
  *H04W 48/18* (2009.01)
  *H04W 76/11* (2018.01)

(56) References Cited

U.S. PATENT DOCUMENTS

| | | | |
|---|---|---|---|
| 2011/0090857 A1* | 4/2011 | Guo | H04W 8/06 370/329 |
| 2011/0269499 A1 | 11/2011 | Vikberg et al. | |
| 2012/0134268 A1 | 5/2012 | Lopez et al. | |
| 2012/0300615 A1 | 11/2012 | Kempf et al. | |
| 2013/0203414 A1* | 8/2013 | Zong | H04W 60/00 455/435.1 |
| 2014/0126458 A1* | 5/2014 | Cho | H04W 76/04 370/312 |
| 2014/0355417 A1 | 12/2014 | Kim et al. | |

FOREIGN PATENT DOCUMENTS

| | | |
|---|---|---|
| CN | 101562908 A | 10/2009 |
| CN | 101795442 A | 8/2010 |
| EP | 2315371 A2 | 4/2011 |
| JP | 2012514934 | 6/2012 |
| WO | 2011/038609 A1 | 4/2011 |
| WO | 2012/160465 A1 | 11/2012 |
| WO | 2013137698 A1 | 9/2013 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.2.0, Sep. 2013, 293 pages.

"3rd Generation Partnership Project; Technical Specification Group Radio Access Network; Evolved Universal Terrestrial Radio Access Network (E-UTRAN); S1 Application Protocol (S1AP)(Release 11)", 3GPP TS 36.413 V11.5.0, Sep. 2013, 274 pages.

* cited by examiner

MESSAGE PROCESSING METHOD, MME SELECTION METHOD, AND APPARATUSES

CROSS-REFERENCE TO RELATED APPLICATIONS

This application is a continuation of International Application No. PCT/CN2014/082260, filed on Jul. 15, 2014, which claims priority to Chinese Patent Application No. 201310482935.3, filed on Oct. 15, 2013, both of which are hereby incorporated by reference in their entireties.

TECHNICAL FIELD

The present application relates to the field of communications technologies, and in particular, to a message processing method, an MME selection method, and apparatuses.

BACKGROUND

A mobility management entity (MME) is a key control node in a Long Term Evolution (LTE) network. The mobility management entity is responsible for managing and storing a user equipment (UE) context, allocating a temporary identity to the UE, authenticating the UE, processing all non-access stratum messages between the mobility management entity and the UE, and the like.

In the LTE network, the UE needs to send an authentication request, a service request, or the like to the MME by using an evolved NodeB (eNB), and the eNB needs to transfer a message by using an S1 interface established between the eNB and the MME. The S1 interface is a logical interface, and is a communications interface between the eNB and the MME. With the development of an LTE network system, more MMEs may be needed to run simultaneously to meet a requirement of the system. Therefore, a quantity of S1 interfaces established between the eNB and the MME in the system and a quantity of other interfaces increase greatly, which increases complexity of the network system. In addition, increase in the quantity of MMEs will inevitably cause consumption of considerable resources.

SUMMARY

In view of this, embodiments of the present application provide a message processing method, an MME selection method, and apparatuses to lower complexity of an LTE network system and reduce resource consumption.

To resolve the foregoing problem, a first aspect of the present application provides a message processing method, where the method includes:

receiving, by a mobility management entity (MME), a first message sent by an evolved NodeB (eNB), where: multiple virtual machines are deployed in the MME; the first message includes a non-access stratum (NAS) message sent by user equipment (UE) and identification information of a target virtual machine; and the identification information of the target virtual machine is generated by the target virtual machine in the MME;

determining, by the MME according to the identification information of the target virtual machine, the target virtual machine from the multiple virtual machines, and allocating the non-access stratum message to the target virtual machine for processing; and returning, by the MME, a first response message generated by the target virtual machine to the eNB, so that the first response message is sent to the UE by using the eNB.

With reference to the first aspect, in a first possible implementation manner, before the returning, by the MME, a first response message generated by the target virtual machine to the eNB, the method further includes:

receiving, by the MME, the identification information that is of the target virtual machine and generated by the target virtual machine; and in addition to the returning, by the MME, a first response message generated by the target virtual machine to the eNB, the method further includes:

returning, by the MME, the identification information that is of the target virtual machine and generated by the target virtual machine to the eNB.

With reference to the first aspect, in a second possible implementation manner, before the returning, by the MME, a first response message generated by the target virtual machine to the eNB, the method further includes:

receiving, by the MME, identification information of the target virtual machine updated by the target virtual machine; and in addition to the returning, by the MME, a first response message generated by the target virtual machine to the eNB, the method further includes:

returning, by the MME, the updated identification information of the target virtual machine to the eNB.

With reference to the first aspect, in a third possible implementation manner, the receiving, by a mobility management entity MME, a first message sent by an evolved NodeB eNB includes:

receiving, by the MME by using the evolved NodeB eNB, the NAS message sent by the user equipment UE, where: the NAS message is carried in a connection establishment request sent by the UE to the eNB; the NAS message carries the identification information of the target virtual machine; and the identification information of the target virtual machine is generated by the target virtual machine in the MME, and is sent by the MME to the UE for storing.

With reference to the third possible implementation manner of the first aspect, in a fourth possible implementation manner, that the NAS message carries the identification information of the target virtual machine includes:

carrying, in the NAS message, a globally unique temporary identity GUTI, where the GUTI includes an identification code that identifies the target virtual machine.

With reference to the fourth possible implementation manner of the first aspect, in a fifth possible implementation manner, that the GUTI includes an identification code that identifies the target virtual machine includes:

including, in the globally unique temporary identity GUTI, a globally unique mobility management entity identifier GUMMEI or a short temporary mobile subscriber identity S-TMSI, where a mobility management entity code MMEC in the GUMMEI or the S-TMSI includes the identification code that identifies the target virtual machine.

With reference to the first aspect or the first possible implementation manner of the first aspect, in a sixth possible implementation manner, the receiving, by a mobility management entity MME, a first message sent by an evolved NodeB eNB includes:

receiving, by the MME, the first message that is sent by the evolved NodeB eNB and carries the NAS message, where: the first message further carries the identification information of the target virtual machine; and the identification information of the target virtual machine is generated by the target virtual machine, and is sent by the MME to the eNB for storing.

With reference to the sixth possible implementation manner of the first aspect, in a seventh possible implementation manner, an S1 interface is established between the MME and the eNB; and that the first message further carries the identification information of the target virtual machine includes:

carrying, in the first message, an identifier MME UE S1AP ID that uniquely identifies the UE over the S1 interface within the MME, where the MME UE S1AP ID includes an identification code that is used to identify the target virtual machine.

A second aspect of the present application provides an MME selection method, including:

receiving, by an evolved NodeB eNB, a connection establishment request sent by user equipment UE, where: the connection establishment request carries a non-access stratum NAS message and first identification information that need to be sent by the UE to a mobility management entity MME; multiple virtual machines are deployed in the MME; the first identification information includes identification information that identifies the MME and identification information that identifies a target virtual machine in the MME; and the first identification information is generated by the target virtual machine, and is sent to the UE for storing;

recognizing, by the eNB, the identification information of the MME from the first identification information, and determining, according to the identification information of the MME, the MME from multiple MMEs that establish an S1 interface to the eNB; and sending, by the eNB, the non-access stratum message and the first identification information to the MME, so that the MME selects, according to the identification information of the target virtual machine in the first identification information, the target virtual machine from the multiple virtual machines to process the NAS message.

With reference to the second aspect, in a first possible implementation manner, the first identification information is a globally unique temporary identity GUTI, where the GUTI includes an identification code that identifies the MME and an identification code that identifies the target virtual machine; and accordingly, the recognizing, by the eNB, the identification information of the MME from the first identification information includes:

recognizing, by the eNB, a preset identification code that is in the GUTI and identifies the MME, so as to determine the identification code of the MME.

With reference to the first possible implementation manner of the first aspect, in a second possible implementation manner, the globally unique temporary identity GUTI includes a globally unique mobility management entity identifier GUMMEI or a short temporary mobile subscriber identity S-TMSI, and a mobility management entity code MMEC in the GUMMEI or the S-TMSI includes the identification code that identifies the target virtual machine and the identification code that identifies the MME; and the recognizing, by the eNB, a preset identification code that is in the GUTI and identifies the MME, so as to determine the identification code of the MME includes:

extracting, by the eNB, the MMEC from the GUMMEI or S-TMSI in the GUTI, and recognizing a specified part that is of the identification code in the MMEC and used to identify the MME, so as to determine the identification code of the MME.

A third aspect of the present application provides a message processing apparatus, where the apparatus is applied to a mobility management entity MME, and the apparatus includes:

a receiving unit, configured to receive a first message sent by an evolved NodeB eNB, where: multiple virtual machines are deployed in the MME; the first message includes a non-access stratum NAS message sent by user equipment UE and identification information of a target virtual machine; and the identification information of the target virtual machine is generated by the target virtual machine in the MME;

a processing unit, configured to determine, according to the identification information of the target virtual machine, the target virtual machine from the multiple virtual machines, and allocate the non-access stratum message to the target virtual machine for processing; and a sending unit, configured to return a first response message generated by the target virtual machine to the eNB, so that the first response message is sent to the UE by using the eNB.

With reference to the third aspect, in a first possible implementation manner, the apparatus further includes:

an identification acquiring unit, configured to receive the identification information that is of the target virtual machine and generated by the target virtual machine; and a first identification transmission unit, configured to: when the sending unit sends the first response message to the eNB, return the identification information that is of the target virtual machine and generated by the target virtual machine to the eNB.

With reference to the third aspect, in a second possible implementation manner, the apparatus further includes:

an identification updating unit, configured to receive identification information of the target virtual machine updated by the target virtual machine; and a second identification transmission unit, configured to: when the sending unit sends the first response message to the eNB, return the updated identification information of the target virtual machine to the eNB.

With reference to the third aspect, in a third possible implementation manner, the receiving unit includes:

a first receiving unit, configured to receive, by using the evolved NodeB eNB, the NAS message sent by the user equipment UE, where: the NAS message is carried in a connection establishment request sent by the UE to the eNB; the NAS message carries the identification information of the target virtual machine; and the identification information of the target virtual machine is generated by the target virtual machine in the MME, and is sent by the MME to the UE for storing.

With reference to the third possible implementation manner of the third aspect, in a fourth possible implementation manner, that the NAS message carries the identification information of the target virtual machine includes:

carrying, in the NAS message, a globally unique temporary identity GUTI, where the GUTI includes an identification code that identifies the target virtual machine.

With reference to the fourth possible implementation manner of the third aspect, in a fifth possible implementation manner, that the GUTI includes an identification code that identifies the target virtual machine includes:

including, in the globally unique temporary identity GUTI, a globally unique mobility management entity identifier GUMMEI or a short temporary mobile subscriber identity S-TMSI, where a mobility management entity code MMEC in the GUMMEI or the S-TMSI includes the identification code that identifies the target virtual machine.

With reference to the third aspect or the first possible implementation manner of the third aspect, in a sixth possible implementation manner, the receiving unit includes:

a second receiving unit, configured to receive the first message that is sent by the evolved NodeB eNB and carries the NAS message, where: the first message further carries the identification information of the target virtual machine; and the identification information of the target virtual machine is generated by the target virtual machine, and is sent by the MME to the eNB for storing.

With reference to the sixth possible implementation manner of the third aspect, in a seventh possible implementation manner, an S1 interface is established between the MME and the eNB; and that the first message further carries the identification information of the target virtual machine includes:

carrying, in the first message, an identifier MME UE S1AP ID that uniquely identifies the UE over the S1 interface within the MME, where the MME UE S1AP ID includes an identification code that identifies the target virtual machine.

A fourth aspect of the present application provides an MME selection apparatus, where the apparatus is applied to an evolved NodeB eNB, and the apparatus includes:

a receiving unit, configured to receive a connection establishment request sent by user equipment UE, where: the connection establishment request carries a non-access stratum NAS message and first identification information that need to be sent by the UE to a mobility management entity MME; multiple virtual machines are deployed in the MME; the first identification information includes identification information that identifies the MME and identification information that identifies a target virtual machine in the MME; and the first identification information is generated by the target virtual machine, and is sent to the UE;

a recognition unit, configured to recognize the identification information of the MME from the first identification information, and determine, according to the identification information of the MME, the MME from multiple MMEs that establish an S1 interface to the eNB; and a sending unit, configured to send the non-access stratum message and the first identification information to the MME, so that the MME selects, according to the identification information of the target virtual machine in the first identification information, the target virtual machine from the multiple virtual machines to process the NAS message.

With reference to the fourth aspect, in a first possible implementation manner, the first identification information is a globally unique temporary identity GUTI, where the GUTI includes an identification code that identifies the MME and an identification code that identifies the target virtual machine; and accordingly, the recognition unit includes:

a first recognition unit, configured to recognize a preset identification code that is in the GUTI and identifies the MME, so as to determine the identification code of the MME.

With reference to the first possible implementation manner of the fourth aspect, in a second possible implementation manner, the globally unique temporary identity GUTI includes a globally unique mobility management entity identifier GUMMEI or a short temporary mobile subscriber identity S-TMSI, and a mobility management entity code MMEC in the GUMMEI or the S-TMSI includes the identification code that identifies the target virtual machine and the identification code that identifies the MME; and the first recognition unit includes:

a first recognition subunit, configured to extract the MMEC from the GUMMEI or the S-TMSI in the GUTI, and recognize a specified part that is of the identification code in the MMEC and used to identify the MME, so as to determine the identification code of the MME.

It can be seen from the foregoing technical solutions that, multiple virtual machines are deployed in a mobility management entity MME; the MME may receive a first message by using an eNB, where the first message includes a NAS message sent by a UE and identification information of a target virtual machine in the MME; and the MME may select, according to the identification information of the target virtual machine, the target virtual machine from the multiple virtual machines to process the NAS message, and return, to the eNB, a first response message that is generated by the target virtual machine and corresponding to the NAS message. Because each virtual machine in the MME can independently perform a message processing operation, one MME can implement processing functions of multiple MMEs, which, on the premise that a service requirement of an LTE network system is met, can significantly reduce a total quantity of MMEs that need to be disposed in the LTE network system, thereby reducing waste of resources. In addition, the MME may receive a message sent by the eNB to any one of the virtual machines, and the MME may transmit, to the eNB, the message sent by the virtual machine. Therefore, only one S1 interface needs to be established between the MME and the eNB, and it is unnecessary to construct an S1 interface for each virtual machine, which reduces a quantity of S1 interfaces that need to be constructed in the LTE system, and further lowers complexity for constructing the LTE system.

BRIEF DESCRIPTION OF THE DRAWINGS

To describe the technical solutions in the embodiments of the present application more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

An embodiment of the present application provides a message processing method, which, on the premise that a requirement for a mobility management entity is met in the LTE system, lowers complexity for establishing an LTE network system and reduces resource consumption.

Embodiments of the present application disclose a method and an apparatus for recognizing a network access behavior. Network access information of a current network access behavior of a user is acquired, and a network access information record of the user is searched for; after the network access information record of the user is found, whether a current network access behavior is a valid network access behavior is determined according to current network access time and last network access time that is in the network access information record. In the embodiments of the present application, each network access behavior is effectively determined, which improves accuracy of recognizing a network access behavior, and therefore makes user behavior analysis result more accurate.

Figure 1:
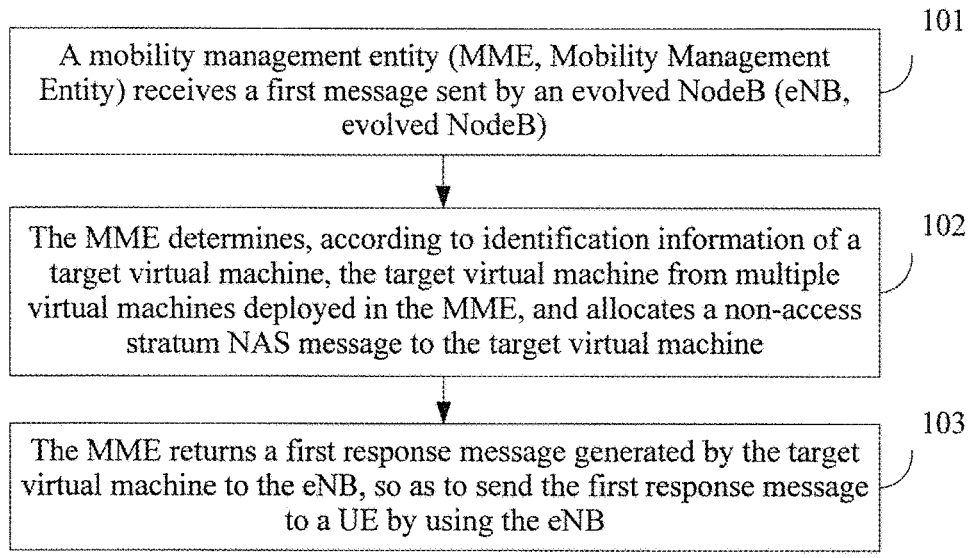
FIG. 1 is a schematic flowchart of an embodiment of a message processing method according to the present application.

Referring to FIG. 1, FIG. 1 shows a schematic flowchart of an embodiment of a message processing method according to the present application. The method in this embodiment is applied to an LTE system, and the method in this embodiment includes:

Step 101: A mobility management entity (MME) receives a first message sent by an evolved NodeB (eNB).

Multiple virtual machines (VM) are deployed in the MME. The first message includes a non-access stratum (NAS) message sent by user equipment UE and identification information of a target virtual machine. The identification information of the target virtual machine is generated by the target virtual machine in the MME.

Different from an existing MME, in this embodiment of this application, the MME has multiple virtual machines that are simulated by using software, so that multiple virtual machines are deployed in the MME. Each virtual machine may independently run an operating system without mutual interference. The multiple virtual machines deployed in the MME all have functions such as mobility management, bearer management, and user authentication.

An S1 interface is established between the MME and the eNB, where the S1 interface is a logical interface. A message is transmitted between the MME and the eNB by using the S1 interface. In this application, an S1 interface is also established between the MME and the eNB, and the multiple virtual machines in the MME may share the S1 interface. In other words, the multiple virtual machines in the MME are actually presented as one network element to the outside, so that the multiple virtual machines in the MME may share the S1 interface to receive and send messages.

In this embodiment of this application, multiple virtual machines are deployed in the MME. To enable the MME to determine, from the multiple virtual machines, a virtual machine that can process the NAS message sent by the UE, the first message sent by the eNB needs to include the identification information of the target virtual machine. The identification information of the target virtual machine is generated by the target virtual machine in the MME. The target virtual machine is a virtual machine, in the MME, that processes the NAS message sent by the UE before the present time. When processing the NAS message sent by the UE before the present time, the target virtual machine generates identification information that uniquely identifies the target virtual machine in the MME.

After processing the NAS message of the UE, the target virtual machine stores related information of the UE, such as a mobility management context, so that a message sent by the UE may be normally processed subsequently. Accordingly, to enable the UE to acquire a related service, when the UE subsequently sends the NAS message to the MME, the MME further needs to allocate the NAS message sent by the UE to the target virtual machine, so as to ensure that the UE can perform a corresponding call service or acquire another service. Therefore, in order that the target virtual machine can be recognized, the identification information of the target virtual machine needs to be carried in the first message.

In a practical application, after generating the identification information of the target virtual machine, the target virtual machine in the MME may return the identification information of the target virtual machine to the UE; the MME may also return the identification information of the target virtual machine to the eNB. Certainly, the target virtual machine may also send the identification information of the target virtual machine to the UE and the eNB, so that the identification information of the target virtual machine is stored in both the UE and the eNB.

Accordingly, the identification information of the target virtual machine included in the first message sent by the eNB may be sent by the UE to the eNB according to different application scenarios. For example, when the UE sends the NAS message to the eNB, the NAS message carries the identification information of the target virtual machine, so that the eNB can generate the first message according to the NAS message and the identification information of the target virtual machine carried in the NAS message.

The identification information of the target virtual machine included in the first message sent by the eNB may also be saved in the eNB. When the eNB receives the NAS message sent by the UE, the eNB determines the MME corresponding to the UE, and the target virtual machine in the MME, and then sends the identification information of the target virtual machine and the NAS message to the E.

Step 102: The MME determines, according to identification information of a target virtual machine, the target virtual machine from multiple virtual machines deployed in the MME, and allocates a NAS message to the target virtual machine.

Because the first message includes the identification information of the target virtual machine, the MME may directly determine, from the deployed multiple virtual machines, a target virtual machine that needs to process the NAS message, and allocate the NAS message to the target virtual machine for processing, so as to ensure that the MME can normally provide a corresponding service for the UE.

A process in which the target virtual machine processes the NAS message is similar to a process in which an existing MME processes a NAS message.

Step 103: The MME returns a first response message generated by the target virtual machine to the eNB, so as to send the first response message to a UE by using the eNB.

After the target virtual machine generates the first response message corresponding to the NAS message, the MME sends the first response message to the eNB. As with the prior art, when sending the first response message to the eNB, the MME also transmits the first response message by using the S1 interface between the MME and the eNB. Therefore, sending of messages by the multiple virtual machines in the MME can be completed without increasing an S1 interface.

In this embodiment of this application, multiple virtual machines are deployed in a mobility management entity MME; the MME may receive a first message by using an eNB, where the first message includes a NAS message sent by a UE and identification information of a target virtual machine in the MME; and the MME may select, according to the identification information of the target virtual machine, the target virtual machine from the multiple virtual machines to process the NAS message, and return, to the eNB, a first response message that is generated by the target virtual machine and corresponding to the NAS message. In the present application, because each virtual machine in the MME can independently perform a message processing operation, one MME can implement message processing functions of multiple MMEs, which, on the premise that a service requirement of an LTE network system is met, can significantly reduce a total quantity of MMEs disposed in the LTE system, thereby reducing waste of resources. In addition, the MME may receive a message sent by the eNB to any one of the virtual machines, and the MME may transmit, to the eNB, the message sent by the virtual machine. Therefore, only one S1 interface needs to be established between the MME and the eNB, and it is unnecessary to construct an S1 interface for each virtual machine, which reduces a quantity of S1 interfaces that need to be constructed in the LTE system, and further lowers complexity for constructing the LTE system.

In a practical application, before returning the first response message, the target virtual machine may also generate the identification information of the target virtual machine, and return the identification information of the target virtual machine and the first response message to the MME. The MME returns the identification information of the target virtual machine and the first response message to the eNB. Optionally, the target virtual machine may regenerate identification information of the target virtual machine only when information of the target virtual machine needs to be updated, so as to update the identification information of the target virtual machine included in the first message. Therefore, when receiving the first response message and the identification information of the target virtual machine, the eNB may store updated identification information of the target virtual machine, or may directly return the updated identification information of the target virtual machine and the first response message to the UE, so that the UE stores the updated identification information of the target virtual machine.

Figure 2:
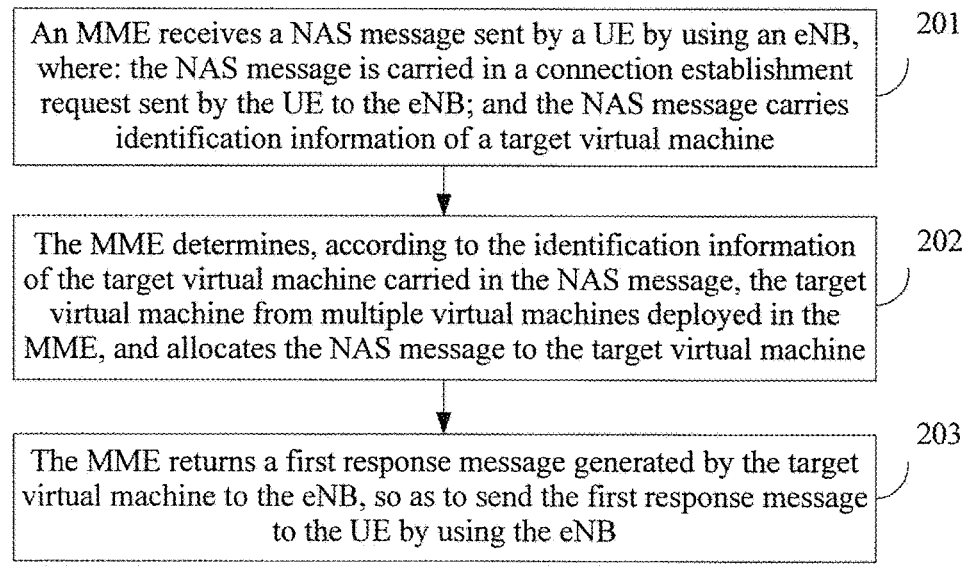
FIG. 2 is a schematic flowchart of another embodiment of a message processing method according to the present application.

Referring to FIG. 2, FIG. 2 shows a schematic flowchart of an embodiment of a message processing method according to the present application. The method in this embodiment is applied to an LTE system, and the method in this embodiment includes:

Step 201: An MME receives a NAS message sent by a UE by using an eNB, where: the NAS message is carried in a connection establishment request sent by the UE to the eNB; and the NAS message carries identification information of a target virtual machine.

The identification information of the target virtual machine is generated by the target virtual machine in the MME, and is sent to the UE. Similar to the foregoing embodiment, if the target virtual machine in the MME has processed the NAS message of the UE, the target virtual machine has ever returned the identification information of the target virtual machine to the UE.

Therefore, when the UE sends the connection establishment request to the eNB again, the connection establishment request may include the NAS message that needs to be sent to the MME. In addition, in order that the MME can re-locate a virtual machine that serves the UE, the NAS message needs to carry the identification information of the target virtual machine. After receiving the connection establishment request, the eNB sends the NAS message and the identification information of the target virtual machine carried in the NAS message to the MME.

The connection establishment request may be a radio resource control (RRC) connection establishment request.

To enable the UE located within the eNB cell to acquire a service from a core network, the UE may send the connection establishment request to the eNB, where the connection establishment request includes the NAS message that needs to be sent to the MME, so that the NAS message is sent to the MME by using the eNB.

Step 202: The MME determines, according to the identification information of the target virtual machine carried in the NAS message, the target virtual machine from multiple virtual machines deployed in the MME, and allocates the NAS message to the target virtual machine.

Step 203: The MME returns a first response message generated by the target virtual machine to the eNB, so as to send the first response message to the UE by using the eNB.

Processes of step 202 and step 203 are similar to those in the foregoing embodiment, and details are not described herein again.

It may be understood that, in a practical application, when a related identifier of an MME is not saved in the UE, the NAS message included in the connection establishment request does not carry identification information of any MME when the UE sends the connection establishment request to the eNB; and the eNB selects an MME from MMEs that establish an S1 interface to the eNB, and sends the NAS message to the MME, so that the MME can receive, by using the eNB, the NAS message sent by the UE.

When a related identifier of an MME is saved in the UE, the NAS message carries related identification information of the MME, and the eNB selects a corresponding MME according to the identification information of the MME, and sends the NAS message to the MME. The foregoing process is similar to a process in which an existing eNB processes a connection establishment request sent by a UE, and details are not described herein again.

Therefore, in order that the eNB can determine, after receiving the connection establishment request, an MME where the target virtual machine is located, the connection establishment request sent by the UE may include the NAS message, the identification information of the MME, and the identification information of the target virtual machine. Specifically, it may be that, in addition to carrying the identification information of the target virtual machine, the NAS message also needs to carry the identification information of the MME. The eNB may determine, according to the identification information of the MME carried in the NAS, the MME from multiple MMEs that establish an S1 interface to the eNB, and send the NAS message and the identification information of the target virtual machine to the MME.

Optionally, in this embodiment of this application, that the NAS message carries the identification information of the MME may be specifically that the NAS message carries a globally unique temporary identity (GUTI), where the GUTI includes an identification code that identifies the target virtual machine. Similar to the prior art in which the connection establishment request includes the GUTI when the UE sends the connection establishment request, in this application, the connection establishment request also needs to include the GUTI. A difference lies in that the GUTI includes the identification code that identifies the target virtual machine, so that the MME acquires the identification code of the target virtual machine from the GUTI, and then determines the target virtual machine from the multiple virtual machines deployed in the MME.

The GUTI includes the identification code of the target virtual machine, which makes it possible for the MME to re-locate a target virtual machine corresponding to the UE in a case in which a connection establishment process on UE side is not changed.

A manner in which the GUTI includes the identification code of the target virtual machine may be: a specified bit in the target virtual machine is used as a bit that identifies the target virtual machine, where the specified bit may be one or more bits. The specified bit is set as the same as the identification code of the target virtual machine, so that the GUTI includes the identification code of the target virtual machine. When acquiring the GUTI again, the MME determines, according to a number of the specified bit in the GUTI, an identifier of a virtual machine corresponding to the number of the specified bit.

The GUTI may include a globally unique mobility management entity identifier (GUMMEI) or a short temporary mobile subscriber identity (S-TMSI). Both the GUMMI and the S-TMSI include a mobility management entity code (MMEC), where the MMEC is used to uniquely identify the MME. Optionally, that the GUTI includes the identification information of the target virtual machine may be: the MMEC included in the GUMMI or S-TMSI in the GUTI includes the identification code of the target virtual machine. Specifically, a specified bit in the MMEC may be used to identify the target virtual machine.

For example, the MMEC generally has 8 bits, and then a part of the bits that represent the MMEC may be used to represent the identification code of the target virtual machine. For example, the first 6 bits of the 8 bits that represent the MMEC may still be used to identify the MME, and the last 2 bits of the MMEC are used to identify a virtual machine in the MME.

In a practical application, after the UE sends the connection establishment request to the eNB, the eNB may not send the identification information of the target virtual machine included in the connection establishment request, such as the GUTI, to the MME. Therefore, to ensure that the eNB always sends the identification information of the target virtual machine to the MME after the eNB receives the NAS message that is sent by the UE and carries the identification information of the target virtual machine, the MME sends a virtual machine instruction to the eNB during a process in which the MME establishes an S1 interface to the eNB, where the virtual machine instruction is used to notify the eNB that multiple virtual machines are deployed in the MME, and instruct the eNB to send the identification information of the target virtual machine carried in the NAS message to the MME each time.

In this embodiment of this application, the identification information of the target virtual machine that is sent by the UE and carried in the NAS message is generated by the target virtual machine in the MME, and is returned to the UE.

Optionally, when the MME receives a NAS message that does not include the identification information of the target virtual machine, the MME selects a virtual machine from the multiple virtual machines deployed in the MME as a target virtual machine to process the NAS. For example, a virtual machine may be randomly selected as a target virtual machine, or a target virtual machine may be selected according to a load balancing principle. In this case, the MME allocates the NAS message to the target virtual machine to process the NAS message. After processing the NAS message, the target virtual machine generates a first response message corresponding to the NAS message, and generates identification information of the target virtual machine. After the target MME returns the first response message and the identification information of the target virtual machine to the LIE by using the eNB, the UE stores the received identification information of the target virtual machine, so that when the UE initiates the connection establishment request again, the connection establishment request includes the NAS message that carries the identification information of the target virtual machine.

In a practical application, if information about a virtual machine of the MME changes and therefore causes identification information of the virtual machine to change, the target virtual machine also regenerates, before returning the first response message generated by processing the NAS message, identification information of the target virtual machine, and returns both the identification information of the target virtual machine and the first response message updated by the MME to the UE, so that the UE updates the identification information of the target virtual machine stored in the UE.

Certainly, it may also be that the target virtual machine generates, before returning the first response message of the NAS each time, the identification information of the target virtual machine. The MME returns the generated identification information of the target virtual machine and the first response message to the UE by using the eNB. Therefore, in this embodiment, the first response message that is returned by the MME to the eNB may further carry the identification information that is of the target virtual machine and generated by the target virtual machine.

Figure 3:
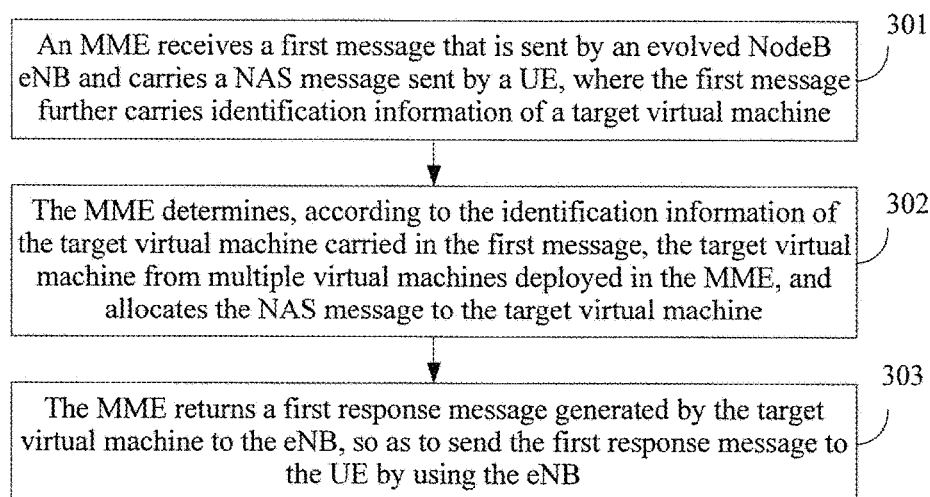
FIG. 3 is a schematic flowchart of another embodiment of a message processing method according to the present application.

Referring to FIG. 3, FIG. 3 shows a schematic flowchart of another embodiment of a message processing method according to the present application. A method in this embodiment may be applied to an LTE system, and the method in this embodiment may include:

Step 301: An MME receives a first message that is sent by an evolved NodeB eNB and carries a NAS message sent by a UE, where the first message further carries identification information of a target virtual machine.

The identification information of the target virtual machine is identification information that is generated by the target virtual machine, sent by the MME to the eNB, and stored in the eNB. Specifically, the identification information of the target virtual machine is identification information that is generated after the target virtual machine processes the NAS message sent by the UE, where the target virtual machine processes the NAS message sent by the UE before the present time; the MME returns the identification information that is of the target virtual machine and generated by the target virtual machine to the eNB, and the eNB stores the identification information of the target virtual machine.

In a practical application, in a case in which a connection is established between the UE and the eNB, for example, an RRC connection is established between the UE and the eNB, the NAS message sent by the UE to the eNB does not need to carry the identification information of the target virtual machine. The eNB may recognize the UE according to a resource block, an air interface resource, a physical channel or the like that is occupied by the UE in sending the NAS message, determine the MME and the identification information of the target virtual machine corresponding to the UE, and then send the first message to the MME. In addition to including the NAS message, the first message further includes the identification information of the target virtual machine determined by the eNB.

Step 302: The MME determines, according to the identification information of the target virtual machine carried in the first message, the target virtual machine from multiple virtual machines deployed in the MME, and allocates the NAS message to the target virtual machine.

The MME determines, according to the identification information of the target virtual machine that is carried in the first message sent by the eNB, a target virtual machine that can process the NAS message, so as to re-locate a target virtual machine that is in the MME and has ever provided a service for the UE, so as to ensure normal message processing.

Step 303: The MME returns a first response message generated by the target virtual machine to the eNB, so as to send the first response message to the UE by using the eNB.

An S1 interface is established between the MME and the eNB, and a message is transferred between the MME and the eNB by using the S1 interface. In the prior art, when returning the first response message to the eNB, the MME also returns, to the eNB by using the S1 interface, an identifier MME UE S1AP ID (MME UE S1AP ID,) that uniquely identifies the UE over the S1 interface within the MME. In addition, in a case in which a connection is established between the UE and the eNB, when receiving the NAS message sent by the UE, the eNB determines the MME UE S1AP ID corresponding to the UE, and sends the MME UE S1AP ID together with the NAS message to the MME.

Therefore, to reduce an transmitted data volume, the target virtual machine may generate the MME UE S1AP ID, and the MME UE S1AP ID may be used in the target virtual machine to uniquely identify the UE over the S1 interface. A difference from the prior art is that the MME UE S1AP ID includes the identification information of the target virtual machine. If a part of bits in the MME UE S1AP ID are still used in the target virtual machine to uniquely identify the UE over the S1 interface, then another part of the bits in the MME UE S1AP ID are used to identify the target virtual machine.

The target virtual machine saves the MME UE S1AP ID that includes the identification information of the target virtual machine. Accordingly, that the first message further carries the identification information of the target virtual machine may be that the first message carries the identifier MME UE S1AP ID that uniquely identifies the UE over the S1 interface within the MME, where the MME UE S1AP ID includes an identification code that identifies the target virtual machine.

Figure 4:
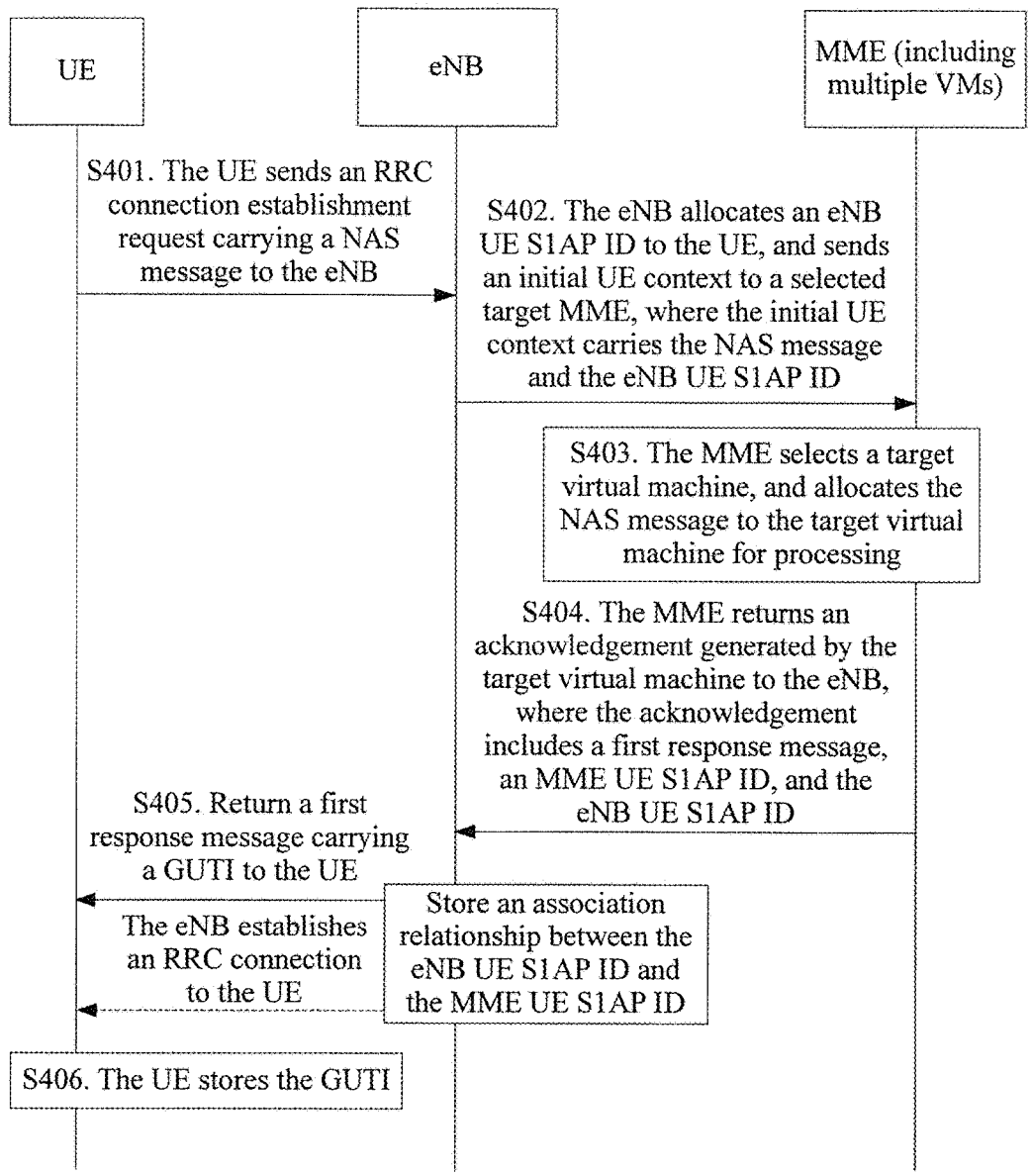
FIG. 4 is a schematic diagram of signaling interworking in another embodiment of a message processing method according to the present application.

In any one of the foregoing embodiments, that the UE or the eNB saves the identification information that is of the target virtual machine and generated by the target virtual machine is used as an example for description. For a better understanding of a process in which the target virtual machine in the MME generates and returns an identifier of the target virtual machine for the UE, reference is made to FIG. 4. FIG. 4 shows a diagram of signaling interworking in another embodiment of a message processing method according to the present application. That the UE does not store an identifier of the MME or an identifier of the target virtual machine is used as an example in the method in this embodiment. The method in this embodiment includes:

Step 401: A UE sends an RRC connection establishment request carrying a NAS message to an eNB.

The RRC connection establishment request does not include identification information of any MME or identification information of the target virtual machine in the MME.

Step 402: The eNB allocates, to the UE, an identifier eNB UE S1AP ID (eNB UE S1AP ID) that uniquely identifies the UE over an S1 interface within the eNB; and selects a target MME, and sends an initial UE context to the target MME, where the initial UE context carries the NAS message and the eNB UE S1AP ID.

In this application, multiple virtual machines are deployed in the MME that is connected to the eNB by using the S1 interface.

Similar to the prior art, because the S1 interface is established between the eNB and the MME, to distinguish between UEs over the S1 interface, the eNB needs to allocate, to the UE, an identifier that uniquely identifies the UE over the S1 interface within the eNB, that is, the eNB UE S1AP ID.

Because the RRC connection establishment request does not include identification information of the MME, the eNB selects, from multiple MMEs that establish the S1 interface to the eNB, an MME as a target MME to process the NAS message; for example, the eNB may randomly select an MME from the multiple MMEs, or may select a target MME according to a load balancing principle. Then, the eNB sends the generated initial UE context including the NAS message and the eNB UE S1AP ID to the target MME. Certainly, a specific process of this step is similar to that of an existing manner, and details are not described herein again.

Step 403: The MME selects a target virtual machine from multiple virtual machines deployed in the MME, and allocates the NAS message to the target virtual machine for processing.

The MME is the target MME. After the MME receives the initial context, because the initial context does not include identification information of the target virtual machine, either, the MME needs to select a target virtual machine from the multiple virtual machines to process the NAS message sent by the UE. For example, the MME may randomly select a virtual machine from the multiple virtual machines as a target virtual machine; or the MME may select, from the multiple virtual machines according to a load balancing principle, a virtual machine with a minimum load as a target virtual machine.

Step 404: The MME returns an acknowledgement generated by the target virtual machine to the eNB.

The acknowledgement includes a first response message corresponding to the NAS message, an MME UE S1AP ID, and the eNB UE S1AP ID sent by the eNB. The first response message carries a GUTI, where the GUTI includes the identification information of the target virtual machine.

The MME UE S1AP ID includes the identification information of the target virtual machine.

A process in which the target virtual machine processes the NAS message is similar to a process in which an existing MME processes a NAS message. A difference is that the target virtual machine further requires that both the generated GUTI and MME UE S1AP ID include the identification information of the target virtual machine.

It should be understood that, an example that a returned identifier is the MME UE S1AP ID and the MME UE S1AP ID includes an identifier of the target virtual machine is used in this embodiment for description. In a practical application, an identifier returned by the MME to the eNB may also be an identifier that includes the MME UE S1AP ID and also includes the identification information of the target virtual machine.

Step 405: The eNB stores an association relationship between the eNB UE S1AP ID and the MME UE S1AP ID, and returns a first response message to the UE to complete an RRC connection to the UE.

Step 406: The UE stores a GUTI carried in the first response message.

The GUTI includes the identification information of the target virtual machine. Certainly, the GUTI also includes identification information of the MME that returns the first response message.

After the UE stores the GUTI, when the UE initiates the connection establishment request to the eNB again, the GUTI may be included in the connection establishment request, so that the eNB re-locates, according to the GUTI, an MME corresponding to the UE, and the MME determines the target virtual machine according to the identification information of the target virtual machine in the GUTI.

In this embodiment, in an example, the first response message carrying the identification information of the target virtual machine is that the first response message carries the GUTI, where the GUTI includes the identification information of the target virtual machine. When the first response message carries the identification information of the target virtual machine in another manner, a process in which the MME returns the identification information of the target virtual machine to the UE is similar to the manner in the embodiment in FIG. 4.

Based on the embodiment in FIG. 4, on the premise that the UE completes an RRC connection to the eNB, if the UE needs to send the NAS message to the MME, the NAS message sent by the UE to the eNB does not need to carry an identifier of the MME or the identification information of the target virtual machine. The eNB may recognize the eNB UE S1AP ID corresponding to the UE according to a resource block, an air interface resource, a physical channel or the like that is occupied by the UE in sending the NAS message, determine the MME UE S1AP ID according to the eNB UE S1AP ID, generate a first message including the MME UE S1AP ID and the NAS message, and then send the first message to the MME. For a specific process, reference may be made to a related description of the embodiment in FIG. 3, and details are not described herein again.

It should be understood that, an example that the UE sends a connection establishment request to the eNB, and the connection establishment request sent by the UE does not include identification information of the target virtual machine is used in this embodiment to introduce a process in which the MME returns the identification information of the target virtual machine to the UE and the eNB. When the MME receives the NAS message carrying identification information of a virtual machine, only a process in which the MME selects the target virtual machine in step 403 is different. After the MME selects the target virtual machine, a process in which the target virtual machine generates the identification information of the target virtual machine, and returns the identification information of the target virtual machine to the UE is the same as that in the embodiment in FIG. 4.

Figure 5:
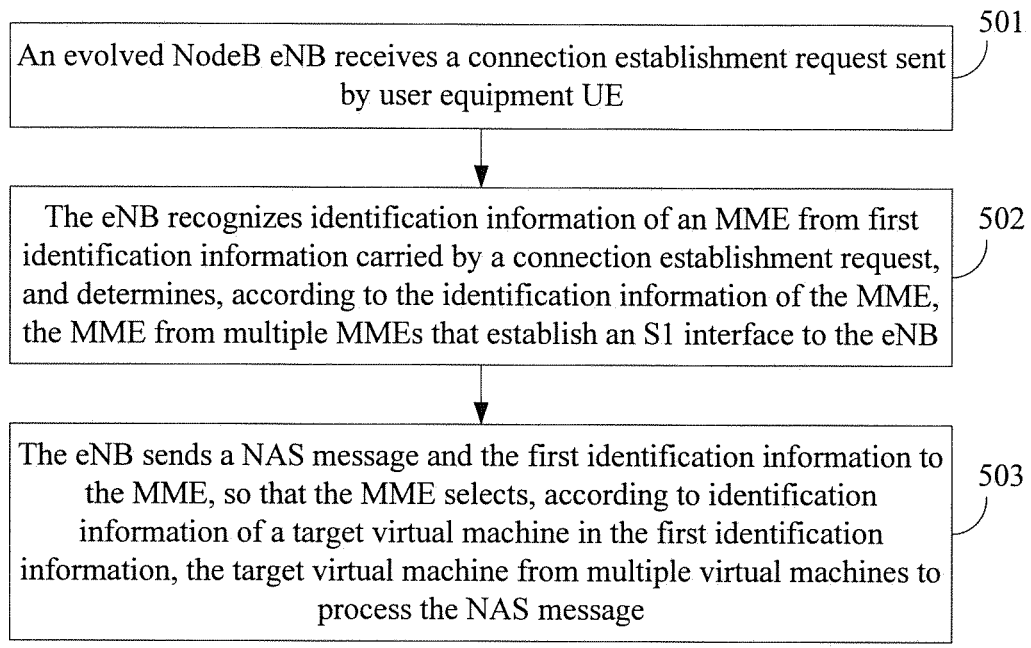
FIG. 5 is a schematic flowchart of an embodiment of an MME selection method according to the present application.

The present application further provides a mobility management entity selection method. Referring to FIG. 5, FIG. 5 shows a schematic flowchart of an embodiment of a mobility management entity selection method according to the present application. The method in this embodiment may include:

Step 501: An evolved NodeB eNB receives a connection establishment request sent by user equipment UE.

The connection establishment request carries a non-access stratum NAS message and first identification information that need to be sent by the UE to a mobility management entity MME. Multiple virtual machines are deployed in the MME. The first identification information includes identification information that identifies the MME and identification information that identifies a target virtual machine in the MME.

The first identification information is generated by the target virtual machine, and is sent to the UE. The target virtual machine is a virtual machine that is in the MME and processes the NAS message sent by the UE. During a process of processing the NAS message sent by the UE before the present time, the target virtual machine generates the first identification information that includes the identification information of the target virtual machine and the identification information of the MME, and returns the generated first identification information to the UE. For a specific process in which the target virtual machine generates the first identification information that includes the identification information of the target virtual machine and the identification information of the MME, reference may be made to related introduction in the foregoing embodiments, and details are not described herein again.

Step 502: The eNB recognizes identification information of an MME from first identification information carried in a connection establishment request, and determines, according to the identification information of the MME, the MME from multiple MMEs that establish an S1 interface to the eNB.

A difference from the prior art is that, in addition to including the identification information of the MME, the first identification information further includes the identification information of the target virtual machine. Therefore, the eNB needs to recognize a part of a field that represents the identification information of the MME from the first identification information, finally determine the identification information of the MME, and then determine, according to the identification information of the MME, an MME that needs to receive the NAS message.

Step 503: The eNB sends a NAS message and the first identification information to the MME, so that the MME selects, according to identification information of a target virtual machine in the first identification information, the target virtual machine from multiple virtual machines to process the NAS message.

In this embodiment, a connection establishment request received by an eNB carries first identification information, where the first identification information includes the identification information of the MME and further includes the identification information of the target virtual machine in the MME. After recognizing the identification information of the MME, the eNB determines, according to the identification information of the MME, the MME from multiple MMEs that establish an S1 interface to the eNB, and sends the first identification information to the MME, so that the MME can determine, according to identification information of a target virtual machine in the first identification information, the target virtual machine from multiple virtual machines, which makes it possible to re-locate a target virtual machine corresponding to the UE, and therefore ensures reliability of message processing.

Optionally, the first identification information may be a globally unique temporary identity GUTI, where the GUTI includes an identification code that identifies the MME and an identification code that identifies the target virtual machine; and accordingly, that the eNB recognizes the identification information of the MME from the first identification information may be: the eNB recognizes a preset identification code that is in the GUTI and that identifies the MME, so as to determine the identification code of the MME.

Further, because the GUTI includes a globally unique mobility management entity identifier GUMMEI or a short temporary mobile subscriber identity S-TMSI, a mobility management entity code MMEC in the GUMMEI or the S-TMSI includes the identification code that identifies the target virtual machine and the identification code that identifies the MME.

Accordingly, the eNB may extract the MMEC from the GUMMEI or S-TMSI in the GUTI, and recognize a specified part that is of the identification code in the MMEC and used to identify the MME, so as to determine the identification code of the MME.

Figure 6:
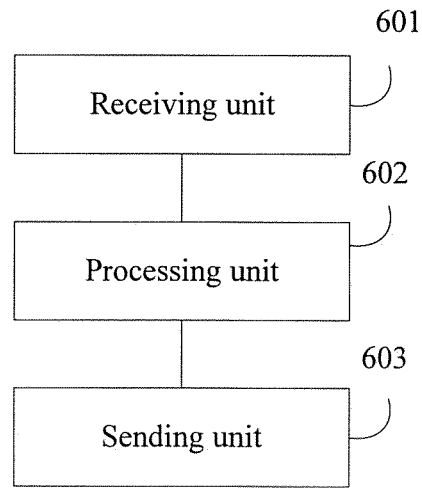
FIG. 6 is a schematic structural diagram of an embodiment of a message processing apparatus according to the present application.

Corresponding to the message processing method in the present application, the present application further provides a message processing apparatus. Referring to FIG. 6, FIG. 6 shows a schematic structural diagram of an embodiment of a message processing apparatus according to the present application. The apparatus in this embodiment is applied to a mobility management entity MME, and the apparatus in this embodiment may include: a receiving unit 601, a processing unit 602 and a sending unit 603.

The receiving unit 601 is configured to receive a first message sent by an evolved NodeB eNB, where: multiple virtual machines are deployed in the MME; the first message includes a non-access stratum NAS message sent by user equipment UE and identification information of a target virtual machine; and the identification information of the target virtual machine is generated by the target virtual machine in the MME.

The processing unit 602 is configured to determine, according to the identification information of the target virtual machine, the target virtual machine from the multiple virtual machines, and allocate the non-access stratum message to the target virtual machine for processing.

The sending unit 603 is configured to return a first response message generated by the target virtual machine to the eNB, so that the first response message is sent to the UE by using the eNB.

Optionally, the apparatus may further include:
an identification acquiring unit, configured to receive the identification information that is of the target virtual machine and generated by the target virtual machine; and
a first identification transmission unit, configured to: when the sending unit sends the first response message to the eNB, return the identification information that is of the target virtual machine and generated by the target virtual machine to the eNB.

Optionally, the apparatus further includes:
an identification updating unit, configured to receive identification information of the target virtual machine updated by the target virtual machine; and
a second identification transmission unit, configured to: when the sending unit sends the first response message to the eNB, return the updated identification information of the target virtual machine to the eNB.

Corresponding to a possible manner of the message processing apparatus of the present application, the receiving unit may include:
a first receiving unit, configured to receive, by using the evolved NodeB eNB, the NAS message sent by the user equipment UE, where: the NAS message is carried in a connection establishment request sent by the UE to the eNB; the NAS message carries the identification information of the target virtual machine; and the identification information of the target virtual machine is generated by the target virtual machine in the MME, and is sent by the MME to the UE for storing.

Optionally, the NAS message further carries the identification information of the MME.

Optionally, that the NAS message received by the first receiving unit carries the identification information of the target virtual machine may be: the NAS message carries a globally unique temporary UE identity GUTI, where the GUTI includes an identification code that identifies the target virtual machine.

Further, because the globally unique temporary identity GUTI includes a globally unique mobility management entity identifier GUMMEI or a short temporary mobile subscriber identity S-TMSI, a mobility management entity code MMEC in the GUMMEI or the S-TMSI includes the identification code that identifies the target virtual machine.

Corresponding to a possible manner of the message processing apparatus of the present application, the receiving unit may include:
a second receiving unit, configured to receive the first message that is sent by the evolved NodeB eNB and carries the NAS message, where: the first message further carries the identification information of the target virtual machine; and the identification information of the target virtual machine is generated by the target virtual machine, and is sent by the MME to the eNB for storing.

An S1 interface is established between the MME and the eNB. That the first message received by the second receiving unit further carries the identification information of the target virtual machine may be: the first message carries an identifier MME UE S1AP ID that uniquely identifies the UE over the S1 interface within the MME, where the MME UE S1AP ID includes an identification code that identifies the target virtual machine.

Figure 7:
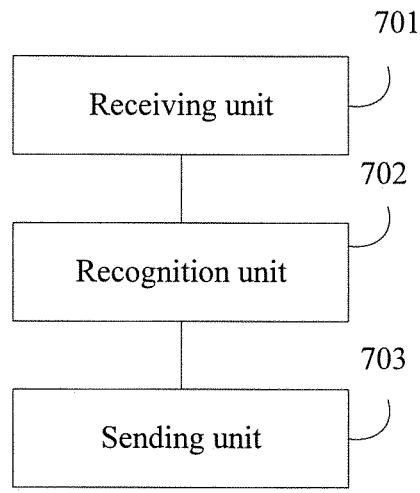
FIG. 7 is a schematic structural diagram of an embodiment of an MME selection apparatus according to the present application.

Corresponding to an MME selection method in the present application, the present application further provides an MME selection apparatus. Referring to FIG. 7, FIG. 7 shows a schematic structural diagram of an embodiment of an MME selection apparatus according to the present application. The apparatus in this embodiment is applied to an evolved NodeB eNB. The apparatus in this embodiment may include: a receiving unit 701, a recognition unit 702, and a sending unit 703.

The receiving unit 701 is configured to receive a connection establishment request sent by user equipment UE, where: the connection establishment request carries a non-access stratum NAS message and first identification information that need to be sent by the UE to a mobility management entity MME; multiple virtual machines are deployed in the MME; the first identification information includes identification information that identifies the MME and identification information that identifies a target virtual machine in the MME; and the first identification information is generated by the target virtual machine, and is sent to the UE.

The recognition unit 702 is configured to recognize the identification information of the MME from the first identification information, and determine, according to the identification information of the MME, the MME from multiple MMEs that establish an S1 interface to the eNB.

The sending unit 703 is configured to send the non-access stratum message and the first identification information to the MME, so that the MME selects, according to the identification information of the target virtual machine in the first identification information, the target virtual machine from the multiple virtual machines to process the NAS message.

Optionally, the first identification information is a globally unique temporary identity GUTI, where the GUTI includes an identification code that identifies the MME and an identification code that identifies the target virtual machine; and accordingly, the recognition unit may include:

a first recognition unit, configured to recognize a preset identification code that is in the GUTI and identifies the MME, so as to determine the identification code of the MME.

Further, because the globally unique temporary identity GUTI includes a globally unique mobility management entity identifier GUMMEI or a short temporary mobile subscriber identity S-TMSI, a mobility management entity code MMEC in the GUMMEI or the S-TMSI includes the identification code that identifies the target virtual machine and the identification code that identifies the MME.

Accordingly, the first recognition unit may include:

a first recognition subunit, configured to extract the MMEC from the GUMMEI or the S-TMSI in the GUTI, and recognize a specified part that is of the identification code in the MMEC and used to identify the MME, so as to determine the identification code of the MME.

Figure 8:
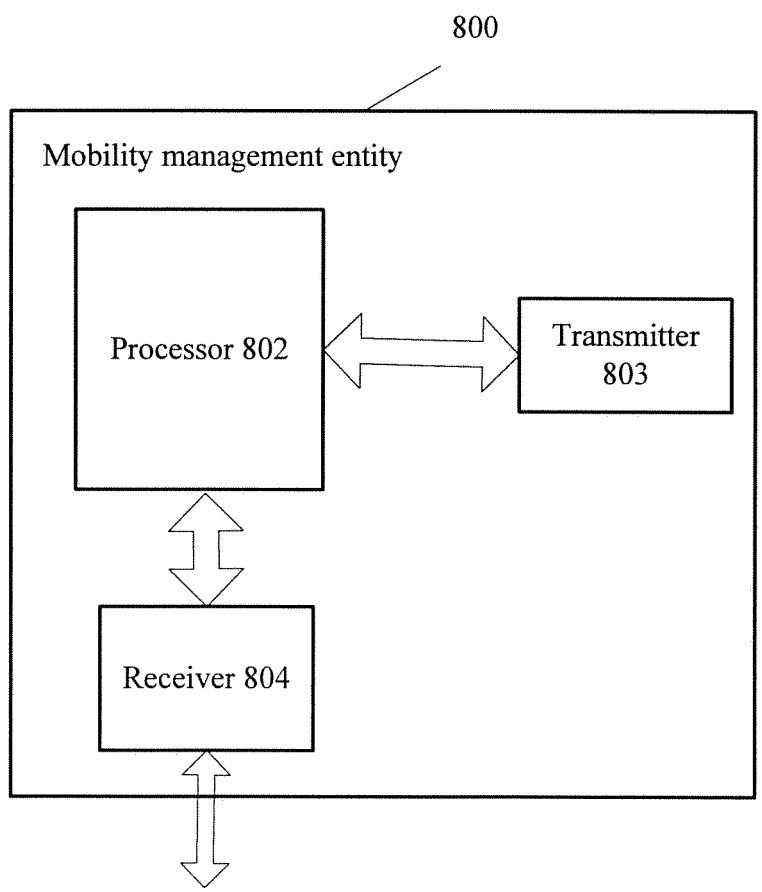
FIG. 8 is a schematic structural diagram of an embodiment of a mobility management entity according to the present application.

According to another aspect, the present application further provides a mobility management entity. Referring to FIG. 8, FIG. 8 shows a schematic structural diagram of an embodiment of a mobility management entity according to the present application. Multiple virtual machines are deployed in a mobility management entity 800 in this embodiment, and the mobility management entity at least includes: a receiver 801, a processor 802, and a transmitter 803.

Both the receiver 801 and the transmitter 803 are connected to the processor 802.

The receiver 801 is configured to receive, by using an evolved NodeB eNB, a first message sent by user equipment UE, where: the first message includes a non-access stratum NAS message sent by user equipment UE and identification information of a target virtual machine; and the identification information of the target virtual machine is generated by the target virtual machine in the MME.

The processor 802 is configured to acquire the identification information of the target virtual machine from the first message received by the receiver; select, according to the identification information of the target virtual machine, the target virtual machine from multiple virtual machines, and allocate a first attach request to the target virtual machine for processing.

The transmitter 803 is configured to return a first response message generated by the target virtual machine to the eNB, so that the first response message is sent to the UE by using the eNB.

Optionally, the first response message carries the identification information of the target virtual machine.

The processor may be a central processing unit CPU, or an application specific integrated circuit ASIC (Application Specific Integrated Circuit), or one or more integrated circuits configured to implement this embodiment of the present application.

Optionally, the mobility management entity may further include: a memory, a communications interface, and a communications bus (not drawn in the figure).

The memory is configured to store a program run on the processor. The memory may include a high-speed RAM memory, and may further include a non-volatile memory.

The processor, the receiver, the transmitter, the memory, and the communications interface complete communication between each other by using the communications bus.

The communications interface is configured to communicate with a network element, such as a base station or a core network equipment.

Figure 9:
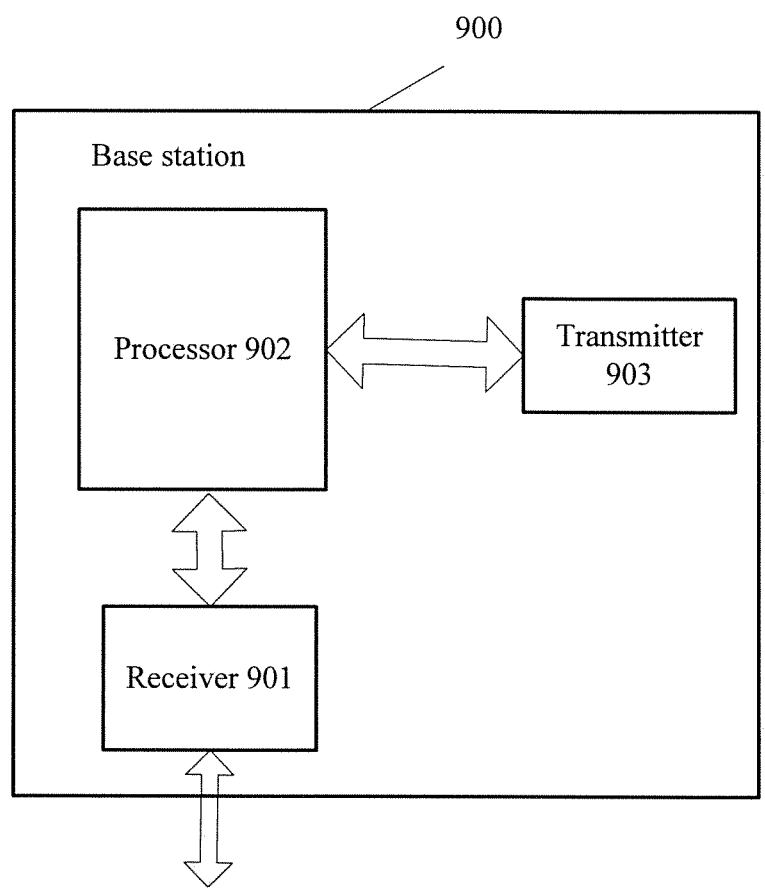
FIG. 9 is a schematic structural diagram of an embodiment of a base station according to the present application.

According to another aspect, the present application further provides a base station. Referring to FIG. 9, FIG. 9 shows a schematic structural diagram of an embodiment of a base station according to the present application. A base station 900 in this embodiment at least includes: a receiver 901, a processor 902, and a transmitter 903.

Both the receiver 901 and the transmitter 903 are connected to the processor 902.

The receiver 901 is configured to receive a connection establishment request sent by user equipment UE, where: the connection establishment request carries a non-access stratum NAS message and first identification information that need to be sent by the UE to a mobility management entity MME; multiple virtual machines are deployed in the MME; the first identification information includes identification information that identifies the MME and identification information that identifies a target virtual machine in the MME; and the first identification information is generated by the target virtual machine, and is sent to the UE.

The processor 902 is configured to acquire the connection establishment request received by the receiver; extract the NAS message and the first identification information from the connection establishment request; and recognize the identification information of the MME from the first identification information; determine, according to the identification information of the MME, the MME from multiple MMEs that establish an S1 interface to the base station; and send the first identification information and the NAS message to the transmitter 803.

The transmitter 903 is configured to send the NAS message and the first identification information to the MME, so that the MME selects, according to the identification information of the target virtual machine in the first identification information, the target virtual machine from multiple virtual machines to process the NAS message; and return a first response message generated by the target virtual machine to the base station, so that the first response message is sent to the UE by using the eNB.

The processor may be a central processing unit CPU, or an application specific integrated circuit ASIC (Application Specific Integrated Circuit), or one or more integrated circuits configured to implement this embodiment of the present application.

Optionally, the mobility management entity may further include: a memory, a communications interface, and a communications bus (not drawn in the figure).

The memory is configured to store a program run on the processor. The memory may include a high-speed RAM memory, and may further include a non-volatile memory.

The processor, the receiver, the transmitter, the memory, and the communications interface complete communication between each other by using the communications bus.

The communications interface is configured to communicate with a network element, such as a base station or a core network equipment.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

In combination with the embodiments disclosed in this specification, method or algorithm steps may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

The embodiments disclosed above are described to enable a person skilled in the art to implement or use the present application. Various modifications to the embodiments are obvious to the person skilled in the art, and general principles defined in this specification may be implemented in other embodiments without departing from the spirit or scope of the present application. Therefore, the present application will not be limited to the embodiments described in this specification but extends to the widest scope that complies with the principles and novelty disclosed in this specification.

What is claimed is:

1. A message processing method, comprising:
receiving, by a mobility management entity (MME), a first message sent by an evolved NodeB (eNB), wherein:
multiple virtual machines are deployed in the MME,
the first message comprises a non-access stratum (NAS) message sent by a user equipment (UE) and identification information of a target virtual machine,
the identification information of the target virtual machine is generated by the target virtual machine in the MME,
wherein the identification information of the target virtual machine is identification information generated after the target virtual machine processes an initial NAS message sent by the UE, where the target virtual machine processes the initial NAS message sent by the UE before the MME receives the first message sent by the eNB, and
wherein the initial NAS message sent by the UE to the eNB does not carry the identification information of the target virtual machine;
determining, by the MME according to the identification information of the target virtual machine, the target virtual machine from the multiple virtual machines, and allocating the NAS message to the target virtual machine for processing; and
returning, by the MME, a first response message generated by the target virtual machine to the eNB, so that the first response message is sent to the UE by using the eNB.

2. The method according to claim 1, wherein:
before returning, by the MME, a first response message generated by the target virtual machine to the eNB, the method further comprises:
receiving, by the MME, the identification information that is of the target virtual machine and generated by the target virtual machine; and
the method further comprises:
returning, by the MME, the identification information that is of the target virtual machine and generated by the target virtual machine to the eNB.

3. The method according to claim 1, wherein:
before returning, by the MME, a first response message generated by the target virtual machine to the eNB, the method further comprises:
receiving, by the MME, identification information of the target virtual machine updated by the target virtual machine; and
the method further comprises:
returning, by the MME, the updated identification information of the target virtual machine to the eNB.

4. The method according to claim 1, wherein receiving, by a mobility management entity (MME), a first message sent by an evolved NodeB (eNB) comprises:
receiving, by the MME by using the eNB, the NAS message sent by the user equipment, wherein:
the NAS message is carried in a connection establishment request sent by the UE to the eNB,
the NAS message carries the identification information of the target virtual machine, and
the identification information of the target virtual machine is sent by the MME to the UE for storing.

5. The method according to claim 4, wherein the NAS message further carries the identification information of the MME.

6. The method according to claim 4, wherein: the NAS message further carries a globally unique temporary identity (GUTI) comprising an identification code that identifies the target virtual machine.

7. The method according to claim 6, wherein:
the GUTI comprises a globally unique mobility management entity identifier (GUMMEI) or a short temporary mobile subscriber identity S-TMSI; and
a mobility management entity code (MMEC) in the GUMMEI or the S-TMSI comprises the identification code that identifies the target virtual machine.

8. The method according to claim 1, wherein:
the first message carries the NAS message and the identification information of the target virtual machine; and
the identification information of the target virtual machine is sent by the MME to the eNB for storing.

9. The method according to claim 1, wherein the initial NAS message is a radio resource control (RRC) connection establishment request that does not include identification information of the MME or identification information of the target virtual machine in the MME.

10. The method according to claim 9, wherein upon receiving the initial NAS message from the UE, the eNB randomly selects the MME from multiple MMEs.

11. The method according to claim 9, wherein upon receiving the initial NAS message from the UE, the eNB randomly selects the target virtual machine according to a load balancing principle.

12. A message processing apparatus applied to a mobility management entity (MME), the apparatus comprising:
a receiver, configured to receive a first message sent by an evolved NodeB (eNB), wherein:
multiple virtual machines are deployed in the MME,
the first message comprises a non-access stratum (NAS) message sent by a user equipment UE and identification information of a target virtual machine,
the identification information of the target virtual machine is generated by the target virtual machine in the MME,
wherein the identification information of the target virtual machine is identification information generated after the target virtual machine processes an initial NAS message sent by the UE, where the target virtual machine processes the initial NAS message sent by the UE before the receiver receives the first message sent by the eNB, and
wherein the initial NAS message sent by the UE to the eNB does not carry the identification information of the target virtual machine;
a processor, configured to determine, according to the identification information of the target virtual machine, the target virtual machine from the multiple virtual machines, and allocate the
NAS message to the target virtual machine for processing; and
a transmitter, configured to return a first response message generated by the target virtual machine to the eNB, so that the first response message is sent to the UE by using the eNB.

13. The apparatus according to claim 12, wherein:
the receiver is configured to receive the identification information that is of the target virtual machine and generated by the target virtual machine; and
the transmitter is configured to: when the transmitter sends the first response message to the eNB, return the identification information that is of the target virtual machine and generated by the target virtual machine to the eNB.

14. The apparatus according to claim 12, wherein:
the receiver is further configured to receive identification information of the target virtual machine updated by the target virtual machine; and
the transmitter is configured to: when the transmitter sends the first response message to the eNB, return the updated identification information of the target virtual machine to the eNB.

15. The apparatus according to claim 12, wherein the receiver is configured to receive, by using the eNB, the NAS message sent by the user equipment (UE), wherein:

the NAS message is carried in a connection establishment request sent by the UE to the eNB;
the NAS message carries the identification information of the target virtual machine; and
the identification information of the target virtual machine is generated by the target virtual machine in the MME, and is sent by the MME to the UE for storing.

16. The apparatus according to claim 15, wherein the NAS message further carries the identification information of the MME.

17. The apparatus according to claim 15, wherein the NAS message carries, in the NAS message, a globally unique temporary identity (GUTI) comprising an identification code that identifies the target virtual machine.

18. The apparatus according to claim 17, wherein:
the GUTI comprises a globally unique mobility management entity identifier (GUMMEI) or a short temporary mobile subscriber identity (S-TMSI); and
a mobility management entity code (MMEC) in the GUMMEI or the S-TMSI comprises the identification code that identifies the target virtual machine.

19. The apparatus according to claim 12, wherein the receiver is configured to receive the first message that is sent by the eNB and carries the NAS message, wherein:
the first message further carries the identification information of the target virtual machine; and
the identification information of the target virtual machine is generated by the target virtual machine, and is sent by the MME to the eNB for storing.

20. The apparatus according to claim 19, wherein:
an S1 interface is established between the MME and the eNB; and
the first message carries an identifier (MME UE S1AP ID) that uniquely identifies the UE over the S1 interface within the MME, and the MME UE S1AP ID comprises an identification code that identifies the target virtual machine.

21. A mobility management entity (MME) selection apparatus applied to an evolved NodeB (eNB), the apparatus comprising:
a receiver, configured to receive a connection establishment request sent by a user equipment (UE), wherein:
the connection establishment request carries a non-access stratum (NAS) message and first identification information that need to be sent by the UE to an MME,
multiple virtual machines are deployed in the MME,
the first identification information comprises identification information that identifies the MME and identification information that identifies a target virtual machine in the MME, and
the first identification information is generated by the target virtual machine, and is sent to the UE,
wherein the first identification information of the target virtual machine is identification information that is generated after the target virtual machine processes an initial NAS message sent by the UE, where the target virtual machine processes the initial NAS message sent by the UE before the receiver receives the connection establishment request sent by the UE,
wherein the initial NAS message sent by the UE to the eNB does not carry the identification information of the target virtual machine;
a processor, configured to recognize the identification information of the MME from the first identification information, and determine, according to the identification information of the MME, the MME from multiple MMEs that establish an S1 interface to the eNB; and a transmitter, configured to send the NAS message and the first identification information to the MME, so that the MME selects, according to the identification information of the target virtual machine in the first identification information, the target virtual machine from the multiple virtual machines to process the NAS message.

22. The apparatus according to claim 21, wherein:

the first identification information comprises a globally unique temporary identity (GUTI) comprising an identification code that identifies the MME and an identification code that identifies the target virtual machine; and the processor is configured to recognize a preset identification code that is in the GUTI and identifies the MME, so as to determine the identification code of the MME.

23. The apparatus according to claim 22, wherein:

the GUTI comprises a globally unique mobility management entity identifier (GUMMEI) or a short temporary mobile subscriber identity (S-TMSI);

a mobility management entity code (MMEC) in the GUMMEI or the S-TMSI comprises the identification code that identifies the target virtual machine and the identification code that identifies the MME; and the processor is configured to extract the MMEC from the GUMMEI or the S-TMSI in the GUTI, and recognize a specified part that is of the identification code in the MMEC and used to identify the MME, so as to determine the identification code of the MME.

* * * * *